(No Model.)

A. DOBLER.
GRINDING MILL.

No. 396,990. Patented Jan. 29, 1889.

WITNESSES:
A. Schehl
Carl Karp

INVENTOR
Anton Dobler
BY
Jacque & Raegener
ATTORNEYS.

UNITED STATES PATENT OFFICE.

ANTON DOBLER, OF NEW YORK, N. Y.

GRINDING-MILL.

SPECIFICATION forming part of Letters Patent No. 396,990, dated January 29, 1889.

Application filed April 16, 1888. Serial No. 270,793. (No model.)

*To all whom it may concern:*

Be it known that I, ANTON DOBLER, of the city, county, and State of New York, have invented certain new and useful Improvements in Grinding-Mills, of which the following is a specification.

This invention relates to means for preventing injurious explosions in grinding-mills; and it consists in certain improvements upon the grinding-mill described in my patent of the United States No. 381,346, dated April 17, 1888.

The objects of the present invention are to provide improved mechanism for controlling the automatic valves of the conveyer.

Figure 1:
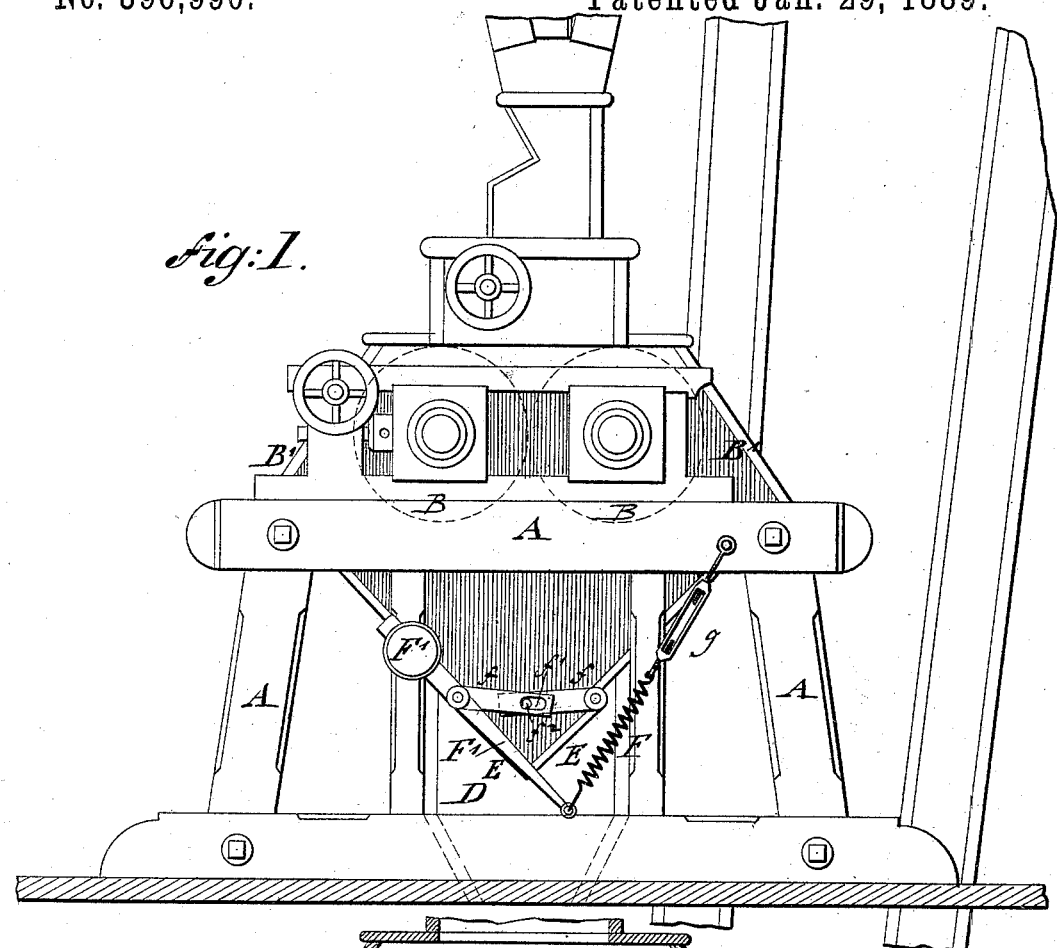
Figure 2:
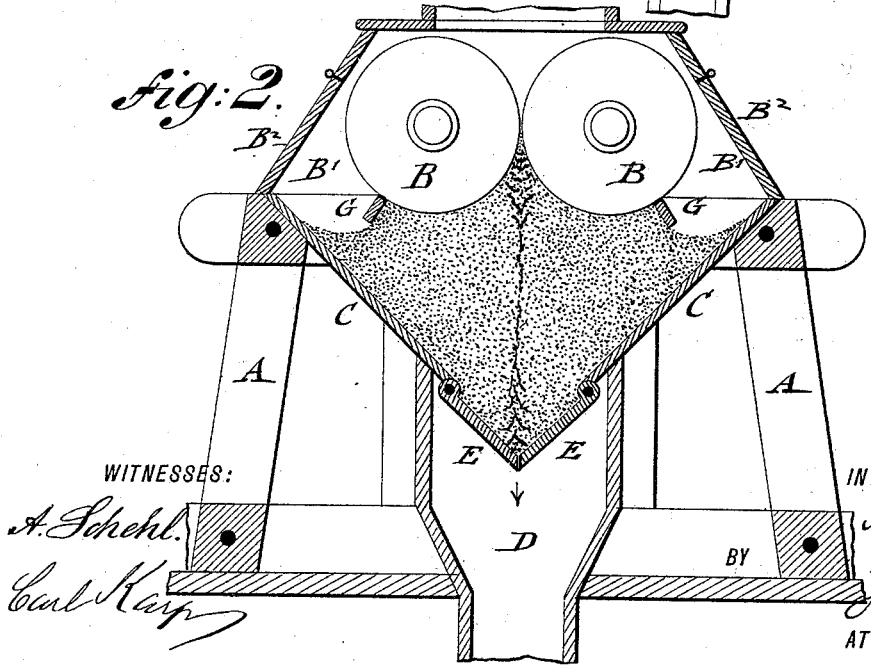

In the accompanying drawings, Figure 1 represents a side elevation of a grinding-mill provided with my improved attachment for preventing injurious explosions; and Fig. 2 is a vertical longitudinal section of the same, in which the wave-line and arrow indicate the direction of the ground material.

Similar letters of reference indicate corresponding parts.

Referring to the drawings, A represents the supporting-frame of my improved grinding-mill for crushing grain or malt. B B are the crushing-rolls, which are located in a casing, B', supported on the frame A, said casing being provided at the lower part with a collecting-hopper, C, and at the sides with hinged doors B², as customary in grinding-mills of this class. The lower end of the hopper C is connected with a conveyer-trunk, D, of the usual construction. The hopper C is closed at the lower ends by two hinged valves, E, which are held in normally-closed position by a spiral spring, F, that is attached to a weighted lever, F', which is keyed to the pintle of one of the valves E. Each pintle of the valves E is provided with a fixed arm, $f$, one arm being provided with a slot, $f'$, at its outer end and the other arm with a pin, $f^2$, which engages said slot, as shown clearly in Fig. 1. The upper end of the spiral spring F is applied to a turn-buckle, $g$, which is hung to the supporting-frame A, the screws of the turn-buckle $g$ serving to adjust the tension of the spring F, so as to support a body of crushed grain or malt in the hopper and regulate the flow of the same from the hopper to the conveyer-trunk. By means of the spring-actuated valves E E a passing mass of crushed grain or malt is kept in direct contact with the lower surface of the rolls. When the pressure of the grain or malt collected above the valves E E overcomes the tension of the spring F, the valves are slightly opened, so as to permit some of the ground grain or malt to escape, while simultaneously a new quantity of crushed material is supplied by the crushing-rolls. By thus keeping the entire space in the hopper below the crushing-rolls filled with ground grain or malt, no air-space can be formed below the rolls, and consequently injurious explosions resulting from a mixture of air and dust are prevented.

Below the crushing-rolls, and at a short distance sidewise of the vertical axis of the same, are arranged fixed outwardly-inclined wipers G, which are in contact with the lower surface of the crushing-rolls B B and keep the same clean, while acting at the same time as guards for keeping the grain in the space directly below the rolls and preventing it from rising at the sides of the rolls. This has the advantage that even if the spiral spring F should not be properly regulated by the attendant, so that the ground grain or malt would pass off quicker than it can be supplied by the crushing-rolls and a small air-space be formed between the crushing-rolls, when an explosion of the air and dust mixture in this small air-space should take place, it would only have the effect of causing the sudden opening of the hinged side gates and the escape of some of the ground grain or malt, but without exerting any injury to the mill or causing a fire. Practical results obtained from a number of machines which have been put up in breweries have shown that explosions are not entirely prevented, but that the injurious effect of the same is almost completely neutralized, as the comparatively small space formed between the crushing-rolls by the irregular working of the valves and the small quantity of the explosive air and dust mixture exerts no injurious influence of any kind on the mill, with the exception of opening the hinged side doors and scattering some of the crushed grain from the hopper.

Having thus described my invention, I claim as new and desire to secure by Letters Patent—

The combination of a pair of crushing-rolls, a collecting-hopper below said rolls, a conveyer-trunk connected to the discharge end of said hopper, two downwardly-inclined hinged valves within said trunk, the lower edges of which meet for closing the trunk, arms fixed at their outer ends to the pintles of said valves and overlapping at their inner ends, one of said arms being provided with a slot and the other with a pin for loosely engaging said slot, a weighted lever attached to the pintle of one of said valves, and a spring connected to said lever for holding the valves in normally-closed position, whereby a passing mass of the ground material is retained in the hopper below the rolls.

In testimony that I claim the foregoing as my invention I have signed my name in presence of two subscribing witnesses.

ANTON DOBLER.

Witnesses:
PAUL GOEPEL,
JOHN A. STRALEY.